(12) United States Patent
Schweitzer, III et al.

(10) Patent No.: US 10,236,675 B2
(45) Date of Patent: Mar. 19, 2019

(54) FAULT DETECTION AND PROTECTION DURING STEADY STATE USING TRAVELING WAVES

(71) Applicant: Schweitzer Engineering Laboratories, Inc., Pullman, WA (US)

(72) Inventors: Edmund O. Schweitzer, III, Pullman, WA (US); Bogdan Z. Kasztenny, Markham (CA); David E. Whitehead, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 15/644,355

(22) Filed: Jul. 7, 2017

(65) Prior Publication Data

US 2018/0034258 A1    Feb. 1, 2018

Related U.S. Application Data

(60) Provisional application No. 62/366,895, filed on Jul. 26, 2016.

(51) Int. Cl.
| | |
|---|---|
| *H02H 1/00* | (2006.01) |
| *H02H 3/08* | (2006.01) |
| *H02H 3/20* | (2006.01) |
| *H02H 3/38* | (2006.01) |
| *H02H 7/26* | (2006.01) |

(52) U.S. Cl.
CPC .......... *H02H 1/0007* (2013.01); *H02H 3/083* (2013.01); *H02H 3/20* (2013.01); *H02H 3/38* (2013.01); *H02H 7/265* (2013.01)

(58) Field of Classification Search
CPC ........ H02H 7/04; H02H 1/0007; H02H 3/083; H02H 3/20; H02H 3/38; H02H 7/265
See application file for complete search history.

(56) References Cited

U.S. PATENT DOCUMENTS

| | | | |
|---|---|---|---|
| 3,585,298 | A | 6/1971 | Liberman |
| 3,670,240 | A | 6/1972 | Maranchak |

(Continued)

FOREIGN PATENT DOCUMENTS

| | | |
|---|---|---|
| EP | 226210 | 12/1986 |
| EP | 241832 | 7/1990 |

(Continued)

OTHER PUBLICATIONS

PCT/US2017/043362 Patent Cooperation Treaty, International Search Report and Written Opinion of the International Searching Authority, dated Nov. 17, 2017.

(Continued)

*Primary Examiner* — Zeev V Kitov
(74) *Attorney, Agent, or Firm* — Richard M. Edge

(57) ABSTRACT

An electric power delivery system may be protected upon occurrence of a fault condition by the systems and methods disclosed herein by detecting the fault condition and signaling a protective action before the overcurrent condition reaches the protective equipment. The protective action may be an opening of a circuit breaker or engagement of a fault current limiter. The overcurrent condition may be a non-steady-state condition. The fault may be detected using traveling wave or incremental quantity techniques.

22 Claims, 9 Drawing Sheets

(56) References Cited

U.S. PATENT DOCUMENTS

| | | | |
|---|---|---|---|
| 3,878,460 | A | 4/1975 | Nimmersjö |
| 3,890,544 | A | 6/1975 | Chamia |
| 3,956,671 | A | 5/1976 | Nimmersjö |
| 4,053,816 | A | 10/1977 | Nimmersjö |
| 4,254,444 | A | 3/1981 | Eriksson |
| 4,296,452 | A | 8/1981 | Eriksson |
| 4,344,142 | A | 8/1982 | Diehr |
| 4,351,011 | A | 9/1982 | Liberman |
| 4,377,834 | A | 3/1983 | Eriksson |
| 4,499,417 | A | 2/1985 | Wright |
| 4,626,772 | A | 12/1986 | Souillard |
| 4,766,549 | A | 8/1988 | Schweitzer |
| 4,797,805 | A | 1/1989 | Nimmersjö |
| 4,800,509 | A | 1/1989 | Nimmersjö |
| 5,446,387 | A | 8/1995 | Eriksson |
| 5,572,138 | A | 11/1996 | Nimmersjö |
| 5,682,100 | A | 10/1997 | Rossi |
| 5,729,144 | A | 3/1998 | Cummins |
| 5,854,729 | A * | 12/1998 | Degeneff ............... H01H 33/59 361/4 |
| 6,417,791 | B1 | 7/2002 | Benmouyal |
| 6,477,475 | B1 | 11/2002 | Takaoka |
| 6,597,180 | B1 | 7/2003 | Takaoka |
| 6,798,211 | B1 | 9/2004 | Rockwell |
| 7,174,261 | B2 | 2/2007 | Gunn |
| 7,535,233 | B2 | 5/2009 | Kojovic |
| 7,733,094 | B2 | 6/2010 | Bright |
| 8,525,522 | B2 | 9/2013 | Gong |
| 8,655,609 | B2 | 2/2014 | Schweitzer |
| 8,781,766 | B2 | 7/2014 | Schweitzer |
| 8,990,036 | B1 | 3/2015 | Schweitzer |
| 9,470,748 | B2 | 10/2016 | Schweitzer |
| 9,594,112 | B2 | 3/2017 | Schweitzer |
| 9,627,881 | B2 | 4/2017 | Schweitzer |
| 2001/0012984 | A1 | 8/2001 | Adamiak |
| 2002/0165462 | A1 | 11/2002 | Westbrook |
| 2004/0189317 | A1 | 9/2004 | Borchert |
| 2004/0230387 | A1 | 11/2004 | Bechhoefer |
| 2006/0012374 | A1 * | 1/2006 | Kojovic ............... G01R 31/085 324/522 |
| 2007/0002506 | A1 * | 1/2007 | Papallo ............... H02H 7/30 361/38 |
| 2008/0077336 | A1 | 3/2008 | Fernandes |
| 2008/0308254 | A1 | 12/2008 | Premerlani |
| 2009/0230974 | A1 | 9/2009 | Kojovic |
| 2011/0173496 | A1 | 4/2011 | Hosek |
| 2011/0264388 | A1 | 10/2011 | Gong |
| 2012/0086459 | A1 | 4/2012 | Kim |
| 2013/0021039 | A1 | 1/2013 | Bjorklund |
| 2013/0096854 | A1 | 4/2013 | Schweitzer |
| 2013/0100564 | A1 | 4/2013 | Zhang |
| 2013/0314828 | A1 | 11/2013 | Chen |
| 2014/0029152 | A1 | 1/2014 | Mazzola |
| 2014/0074414 | A1 | 3/2014 | Schweitzer, III |
| 2014/0104738 | A1 | 4/2014 | Schweitzer, III et al. |
| 2016/0077149 | A1 | 3/2016 | Schweitzer |

FOREIGN PATENT DOCUMENTS

| | | |
|---|---|---|
| EP | 164711 | 12/1991 |
| EP | 244649 | 4/1992 |
| EP | 627085 | 12/2005 |
| GB | 1463755 | 2/1977 |
| WO | 9519060 | 7/1995 |
| WO | 2010099585 | 9/2010 |

OTHER PUBLICATIONS

S. Eckroad; Superconducting Fault Current Limiters—Technology Watch 2009; Dec. 2009.

Harshad Mehta, Fault Location Techniques for High-Voltage DC Lines, EPRI EL-4331 Project 2150-1, 1985.

Masaoki Ando, Edmund O. Schweitzer III, R. A. Baker, Development and Field-Data Evaluation of Single-End Fault Locator for Two-Terminal HVDC Transmission Lines, IEEE Transactions on Power Apparatus and Systems, vol. PAS-104, No. 12, 1985.

Masaoki Ando, Fault Location Techniques for HVDC Lines: Analysis, Development, Simulation, and Field-Data Evaluation, 1984.

P.F. Gale, Overhead Line Fault Location Based on Travelling Waves & GPS, 1993.

Harry Lee, Development of an Accurate Transmission Line Fault Locator Using the Glabal Positioning System and Satellites, 1994.

Hewlett Packard, Traveling Wave Fault Location in Power Transmission Systems, Application Note 1285, 1997.

Michael A. Street, Delivery and Application of Precise Timing for a Traveling Wave Powerline Fault Locator System, 1990.

Sergio Luiz Zimath, Marco Antonio Ramos, Jayme Silva Filho, Joaquim Moutinho Beck, Nei Mueller, Traveling Wave-Based Fault Location Experiences, 2010.

Qualitrol Corporation, Telefault TWS Traveling Wave Fault Locator, Qualitrol Brochure 2004.

Elhaffar, Power Transmission Line Fault Location Based on Current Traveling Waves. TKK Dissertations 107, Espoo 2008, Helsinki University of Technology. Department of Electrical Engineering, Dec. 2008.

Reason International, Inc., Traveling Wave Fault Location in Power Transmission Systems, White Paper.

Carlos Alberto Dutra, Rafael Rosar Matos, Sergio Luiz Zimath, Jurandir Paz De Oliveira, Joao Henrique Monteiro De Resende, Joaquim Americo Pinto Moutinho, Fault Location by Traveling Waves: Application in High Impedance Events.

N. Fischer, V. Skendzic, R. Moxley, J. Needs, Protective Relay Traveling Wave Fault Location, Feb. 9, 2012.

Borghetti, et al, "On the use of continuous-wavelet transform for fault location in distribution power systems." International Journal of Electrical Power & Energy Systems. Nov. 2006.

Maher M.I. Hashim, Hew Wooi Ping, V.K. Ramachandaramurthy, Impedance-Based Fault Location Techniques for Transmission Lines, Sep. 2009.

Zheng et al., Study on Impedance-Traveling Wave Assembled Algorithm in One-Terminal Fault Location System for Transmission Lines, Apr. 2008.

Gabriel Benmouyal, Karl Zimmerman, Experience With Subcycle Operating Time Distance Elements in Transmission Line Digital Relays, Presented at the 37th Annual Western Protective Relay Conference Oct. 2010.

Edmund O. Schweitzer, III, Armando Guzman-Casillas, Mangapathirao Venkat Mynam, Veselin Skendzic, Bogdan Kasztenny, Stephen Marx, Locating Faults by the Traveling Waves They Launch, Feb. 10, 2014.

Toshio Takagi, Jun-Ichi Baba, Katauhiko Usmura, Tishiaki Sakaguchi, Fault Protection Based on Travelling Wave Theory—Part I Theory, Jan. 24, 1977.

He, Baina, Yunwei Zhao, and Hengxu Ha. "A Novel Wave Based Differential Protection for Distributed Parameter Line." TELKOMNIKA Indonesian Journal of Electrical Engineering TELKOMNIKA 11.9 (2013): 5097-104.

Tang, Lanxi; Dong, Xinzhou; Shi, Shenxing; Wang, Bin; "Travelling Wave Differential Protection Based on Equivalent Travelling Wave", 13th IET International Conference on Developments in Power System Protection (DPSP 2016), Mar. 7-10, 2016.

* cited by examiner

FAULT DETECTION AND PROTECTION DURING STEADY STATE USING TRAVELING WAVES

RELATED APPLICATION (None)

TECHNICAL FIELD

This disclosure relates to electric power system protection. More particularly, this disclosure relates to detection of electrical faults using traveling waves and signaling a protective action before the current approaches a fault level.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
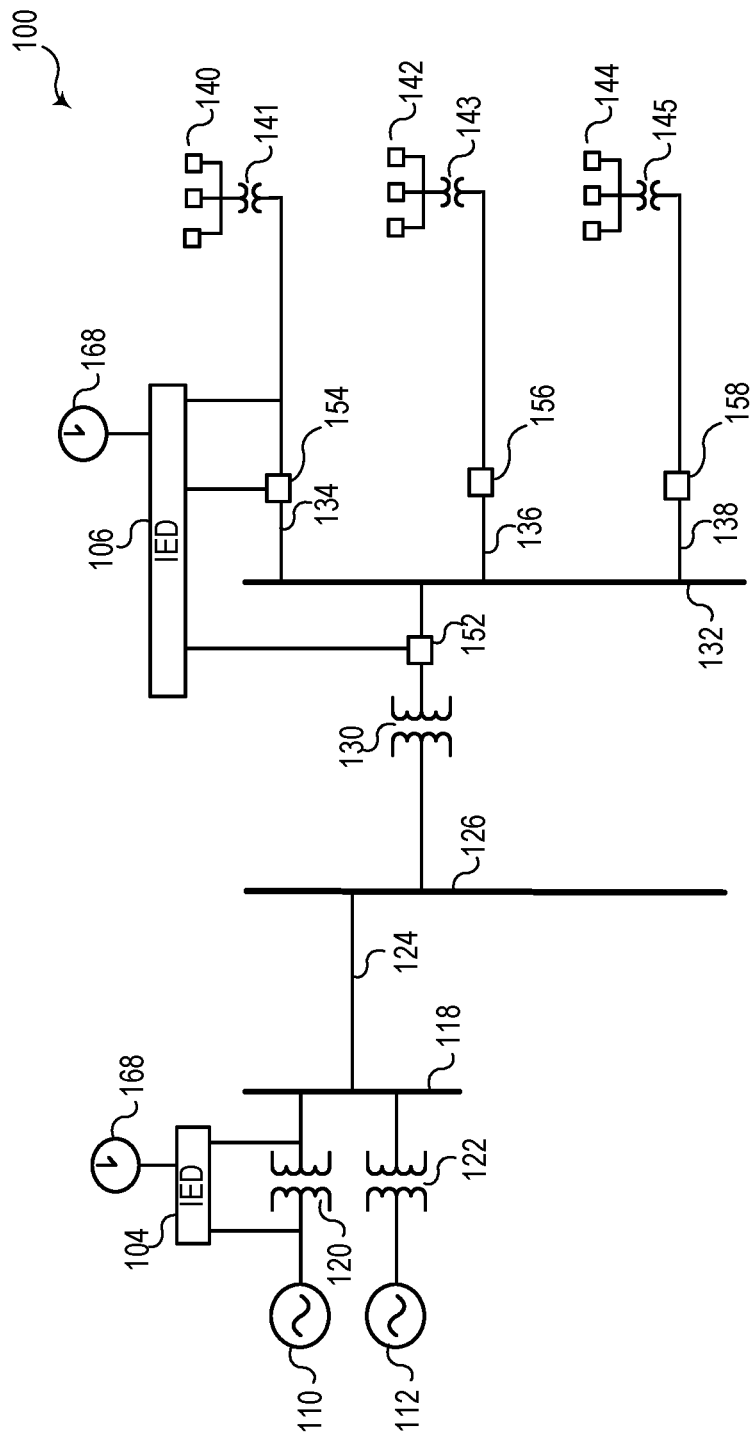
FIG. 1 illustrates a one-line diagram of an electric power delivery system.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Electric power is typically delivered from generation sites to consumers using a combination of local, distributed, and wide-area electric power transmission and distribution systems. Electric power delivery systems at times experience faults that require opening of a circuit breaker or other protection actions. Faults that result in high-current may damage electric power system equipment, and may be hazardous. Thus, removal of a faulted section of the electric power system should be performed as soon as is practical upon detection of a traveling wave or a fault condition.

FIG. 1 illustrates a simplified one-line diagram of an electric power delivery system 100. The system 100 includes generators 110 and 112 for generating electric power, which is stepped up to transmission voltages at bus 118 using transformers 120 and 122. Transmission line 124 connects bus 118 with bus 126, which may be fed by other generation (not separately illustrated). Electric power from bus 126 may be stepped down to distribution voltages using transformer 130, and distributed to various loads 140, 142, and 144 using distribution (or feeder) lines 134, 136, and 138, and further transformers 141, 143 and 145. Each distribution line 134, 146, and 138 may be selectively connected to bus 132 via a circuit breaker 154, 156, and 158, respectively. Further, bus 132 may be selectively connected to transformer 130 using circuit breaker 152. It should be noted that, unless otherwise explicitly stated, circuit breakers 152, 154, 156, and 158 could be any suitable type of switching device such as, for example, circuit breakers, reclosers, solid-state switching devices, switches, microelectromechanical systems ("MEMS") switching device, or the like.

The electric power delivery system 100 may be monitored, protected, or controlled using intelligent electronic devices ("IEDs") 104 and 106. IED 104 may monitor electric current and/or voltage on the high and low sides of transformer 120, and provide protection as needed. IED 104 may receive a common time signal 168. IED 106 may monitor current and/or voltage on distribution line 134, and control circuit breaker 154 and/or 152. IED 106 may control circuit breakers 154 and/or 152 according to the various embodiments disclosed herein.

Electric power delivery systems, such as that illustrated in FIG. 1 are typically designed to operate at a steady state. For example, portions of electric power delivery systems may be designed to operate at nominal voltages and current levels. Electric power delivery systems may be designed to operate at a nominal frequency. Electric power delivery systems operating outside of such predetermined nominal conditions may be said to be out of steady state. Diversion of an electric power delivery system out of steady state may be caused by, for example, a fault at a portion of the electric power delivery system.

Faster protection improves electric power system stability. If faults are not cleared before the critical fault clearing time, the system may lose transient stability and possibly suffer a black out. In addition, faster fault clearing increases the amount of power that can be transferred. Faster protection also enhances public and utility personnel safety, limits equipment wear, improves power quality, and reduces property damage.

Most protection principles are based on the fundamental frequency components of voltages and currents. Accurate measurement of a sinusoidal quantity typically takes a cycle. To increase the speed of protection actions, an analysis of transient components may be undertaken in connection with various embodiments of the present disclosure. Further, information relating to electrical conditions may be communicated among devices to provide end-to-end transmission line protection.

Primary protective relaying systems typically operate in one to one-and-a-half cycles, and the breakers interrupt current in one-and-a-half to three cycles, so faults are typically cleared in three to four cycles. Sometimes the relaying system operates faster. For example, sensitive instantaneous overcurrent elements can be used for switch-onto-fault events, and may have an operation time as low as one-quarter of a cycle. Traditional frequency domain techniques obtained by extracting fundamental frequency components (phasors) may be applied to identify a fault after transient signal components fade. The filtering necessary for phasor measurement results in operating times of about one power cycle, with the best-case times approaching half a cycle for close-in high-current faults.

However, for purposes of determining stability limits for planning purposes, it is most appropriate to utilize conservative protection operating times. If a breaker fails to trip, breaker failure schemes take over, and fault clearing is delayed until the backup breaker operates, which may be around 10 to 12 cycles. If time-coordinated remote backup protection is used instead of breaker failure protection, the fault clearing time may be as high as a few hundred milliseconds.

High-speed protection devices respond to high-frequency signal components, which may be used to detect faults and to realize various advantages. For example, certain nontraditional energy sources, such as wind and solar, are connected to the power system through a power electronics interface. As such, these sources typically have little or no inertia. Their control algorithms protect the converters for network fault conditions. As a result, these sources produce voltages and currents that challenge some protection principles developed for networks with synchronous generators. In contrast, high-speed protection devices configured to respond to high-frequency signal components are less dependent on the sources and more dependent on the network itself. As a result, such relays may be useful in applications near nontraditional sources.

Various embodiments consistent with the present disclosure may analyze traveling waves (TWs) to aid in the clearing of faults. When a fault occurs in an electric power system, traveling waves are launched from the fault and travel outward at a velocity near the speed of light. The traveling waves are reflected by buses and other discontinuities according to their corresponding characteristic impedances. In the initial stage of the fault, the electric power system may behave like a distributed parameter network. Accordingly, the traveling waves may be described by the propagation velocity, the reflection and transmission coefficients, and the line characteristic impedance. Using a traveling wave protection algorithm, a high-speed relay may be able to detect a fault and initiate corrective action in less than 1 millisecond consistent with certain embodiments of the present disclosure.

Figure 2:
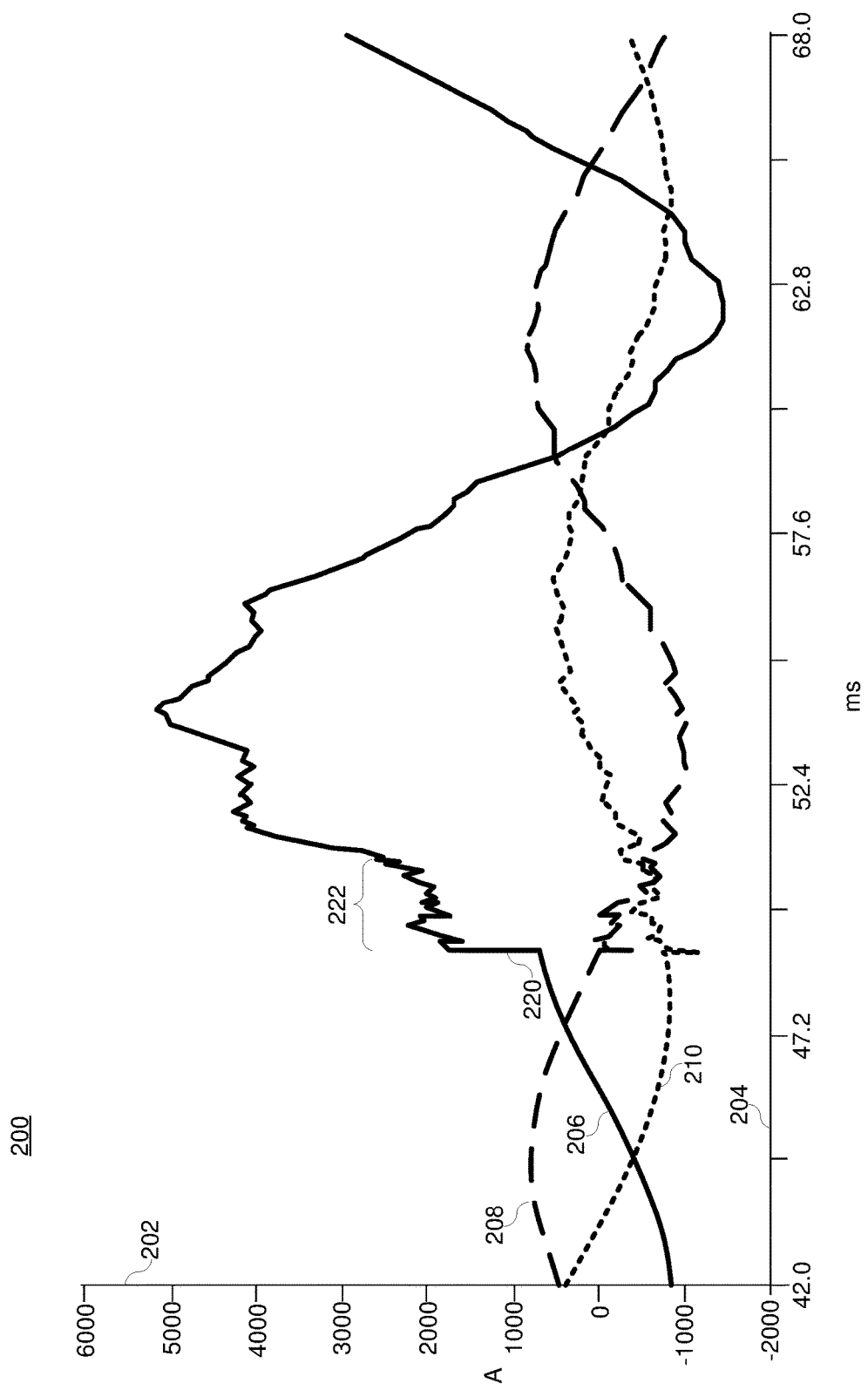
FIG. 2 illustrates a diagram of current values on a three-phase electric power delivery system during the inception of a fault condition.

FIG. 2 illustrates a diagram 200 of current values over a period of time during a fault condition, where the ordinate 202 is in Amperes (A), and the abscissa 204 is in milliseconds (ms). Waveform 206 may be representative of an A-phase of a three-phase electric power system, waveform 208 may be representative of a B-phase of a three-phase electric power system, and waveform 210 may be representative of a C-phase of a three-phase electric power system.

Initially, starting at time 42.0, the system is operating at steady state. During steady state, the peaks of each phase is under a nominal current condition of around 1000 A. At some time, a fault occurs on the A-phase of the electric power delivery system, which casts a traveling wave on the A-phase. The traveling wave reaches an IED monitoring the electric power delivery system after time 47.2, indicated by rise in current 220. As can be seen, the waveform illustrates a delay 222 between the initial current rise 220 due to the traveling wave and the start of the overcurrent condition resulting from the fault. During the delay 222, the current value is around twice the nominal current of the system.

Upon detection of a fault on an electric power delivery system, typical IEDs may be configured to protect the system by disconnecting the faulted portion of the electric power delivery system. Because faults are typically detected by the overcurrent condition, power systems are often no longer in steady state, or experiencing nominal current conditions. Thus, a circuit breaker must be opened in an overcurrent or non-steady-state condition to remove electric power from the faulted section of the electric power delivery system. Under such conditions, circuit breakers may be rated to open at a current that is much higher than nominal and/or interrupt the current at the next zero-crossing.

Several embodiments of the present disclosure take advantage of the delay 222 between the time that the traveling wave is detected and the time that an overcurrent condition is introduced, or the time that the system leaves steady state. In particular, an IED in accordance with the present invention is configured to detect a fault using traveling waves or incremental quantities, and send a protection command before the current rises to the fault level at the location of the IED.

The protection command may be a command to a breaker such as breaker 134 to open. Breaker 134 may be a breaker capable of opening under the electric power system conditions at the time that the protection command is sent thereto. In some embodiments, the IED 106 may determine if the breaker 134 has time to open before the system leaves steady state conditions, or before the overcurrent condition exceeds the safe opening conditions of the breaker 134. Breaker 134 may be capable of interrupting current at a value of around twice the nominal current of the electric power delivery system. Breaker 134 may be, for example, a solid state circuit breaker, a breaker using microelectromechanical systems, or the like.

In other embodiments, the protection command may be a command to engage a fault current limiter to limit the fault current. In certain embodiments, the fault current limiter may limit the fault current on the faulted feeder 134 and allow circuit breaker 154 to open. In other embodiments, the fault current limiter may limit the fault current to the bus 132 and allow circuit breaker 154 to open.

Figure 3:
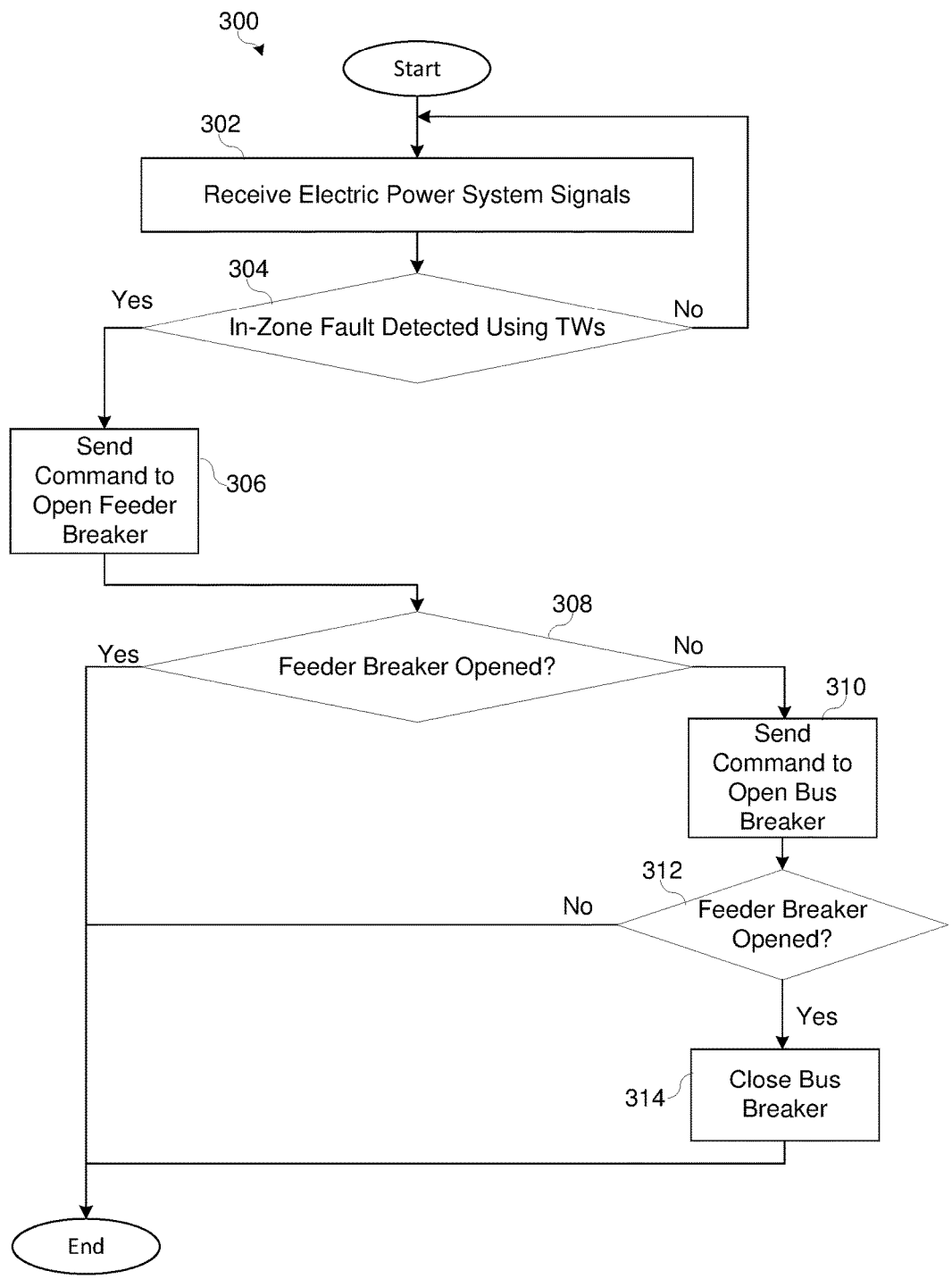
FIG. 3 illustrates a method of protecting an electric power system by detecting a traveling wave.

FIG. 3 illustrates one method 300 of protecting an electric power delivery system such as the system illustrated in FIG. 1 according to one embodiment. An IED such as IED 106 of FIG. 1 may be configured to monitor a feeder 134 of an electric power delivery system. IED 106 may be configured to obtain electric signals related to the operating conditions of the electric power delivery system such as current, voltage, frequency, or the like. To obtain the electric signals, IED 106 may be in electrical communication with the electric power delivery system using current transformers (CTs), potential transformers (PTs), or the like. IED 106 may further be in communication with feeder breaker 154 and/or bus breaker 152, to send protection commands to such breakers. In certain embodiments, IED 106 may be configured to send protection commands to bus breaker 152 via another IED in communication therewith.

The method 300 starts with the IED 106 receiving the electric power system signals 302. Using traveling wave fault detection or incremental quantity fault detection techniques, the IED 106 may detect an in-zone fault using traveling wave detection techniques 304. If an in-zone fault is detected 304, the method immediately sends a command to open the feeder breaker 306 to open the feeder on which the fault is detected, such as breaker 154 of feeder 134 illustrated in FIG. 1. As discussed hereinabove, the feeder breaker may be a breaker capable of opening during the condition detected by the IED. In one particular embodiment, the method may end after sending the command to open the feeder breaker. If the feeder breaker is unable to open before the current exceeds the rated opening threshold of the breaker, the electric power system may rely on backup protection methods such as a bus breaker (such as breaker 152 of FIG. 1 opening) or a fuse opening.

According to the illustrated embodiment, the method 300 determines whether the feeder breaker opened 308. In some embodiments, the method may continue to monitor the current through the feeder to determine whether the feeder breaker has opened. If the feeder breaker has opened, then the method may end.

The feeder breaker may not open if, for example, the current through the breaker exceeds an opening threshold for the particular breaker. That is, if the breaker is not rated to open during the present current condition, it may not open. Thus, if the feeder breaker has not opened 308, the method may continue to send a command to open the bus breaker 310 such as, for example, bus breaker 152 of FIG. 1. The bus breaker may be a typical circuit breaker, operating on a longer time scale, and may require for a zero-crossing to open. After the command is sent to open the bus breaker, the method may continue to monitor current in the feeder. The method may continue to detect whether the feeder breaker has opened. If the feeder breaker fails to open after a predetermined amount of time, the method may end. In various embodiments, the method may continue to monitor the feeder breaker in step 312 and not end until the feeder breaker has opened. In such embodiments, the method may further send additional commands to open the feeder breaker. If the feeder breaker has opened 312, the method may close the bus breaker 314, thus restoring power to the remaining feeders, and end.

Figure 4:
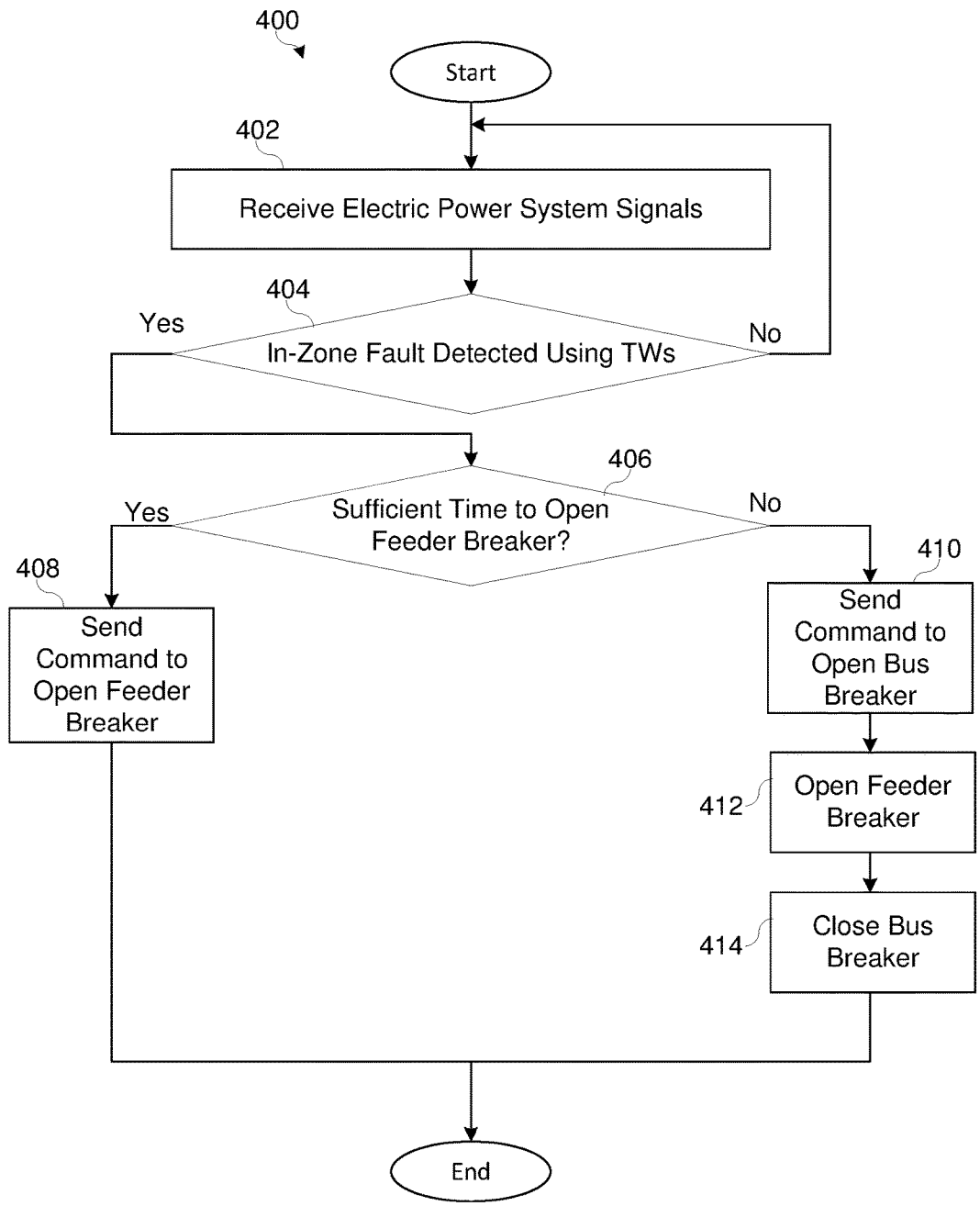
FIG. 4 illustrates another method of protecting an electric power system by detecting a traveling wave.

FIG. 4 illustrates another method 400 of protecting an electric power delivery system such as the system illustrated in FIG. 1 according to one embodiment. Similar to the method illustrated and described in conjunction with FIG. 3, in the method of FIG. 4, an IED, such as IED 106 of FIG. 1 may be configured to monitor a feeder 134 of an electric power delivery system. IED 106 may be configured to obtain electric signals related to the operating conditions of the electric power delivery system such as current, voltage, frequency, or the like. To obtain the electric signals, IED 106 may be in electrical communication with the electric power delivery system using current transformers (CTs), potential transformers (PTs), or the like. IED 106 may further be in communication with feeder breaker 154 and/or bus breaker 152, to send protection commands to such breakers. In certain embodiments, IED 106 may be configured to send protection commands to bus breaker 152 via another IED in communication therewith.

The method 400 starts with the IED 106 receiving the electric power system signals 402. Using traveling wave fault detection or incremental quantity fault detection techniques, the IED 106 may detect in-zone fault 404. If an in-zone fault is not detected, the method returns to 402. If, however, an in-zone fault is detected, the method continues to determine if sufficient time remains for the feeder breaker to open 406. This may include a determination as to whether the feeder breaker has time to open before the system leaves a steady state condition, before an overcurrent condition reaches the breaker, before the current at the breaker is too high for the breaker to open, or the like. If it is determined that there is sufficient time for the feeder breaker to open 406, then the method commands the feeder breaker to open 408. Otherwise, the method instead sends a command to open the bus breaker 410 such as bus breaker 152 of FIG. 1. Once the bus breaker is open, electric power is disconnected from the bus and all feeders, including the feeder experiencing the fault. In order to preserve electric power service to the non-faulted feeders, the feeder breaker associated with the faulted feeder (such as breaker 154 of FIG. 1) is then opened 412, and the bus breaker is closed 414. The method may then end.

Figure 5:
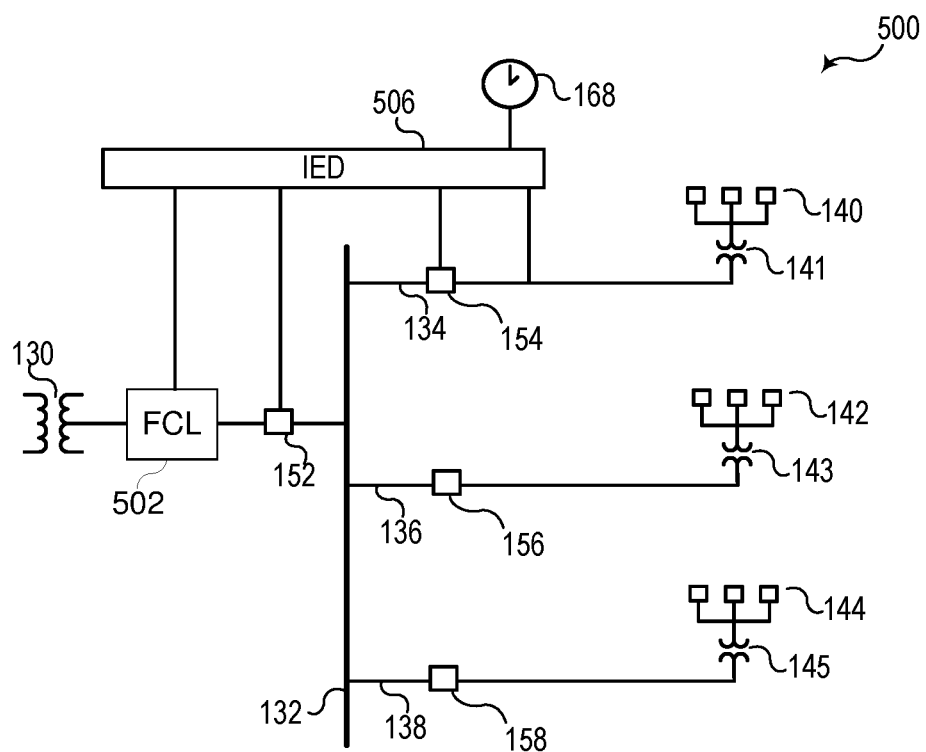
FIG. 5 illustrates a one-line diagram of a portion of an electric power delivery system.

In other embodiments, the electric power system may be configured with one or more fault current limiters. FIG. 5 illustrates a portion of an electric power delivery system 500 similar to the system illustrated in FIG. 1. The transmission line from transformer 130 to bus 132 includes a fault current limiter 502 in communication with IED 506. The fault current limiter 502 may be configured to be somewhat invisible to the electric power delivery system during non-fault events. That is, during nominal current conditions, the fault current limiter may provide little or no impedance to the electric power delivery system. During an overcurrent condition, however, the fault current limiter 502 may be activated to limit the current flowing to the fault. A fault current limiter may function by introducing sufficient impedance to the electric power delivery system to limit the amount of current flowing to the fault. Fault current limiters may similarly function by increasing resistance or using inductance.

Figure 6:
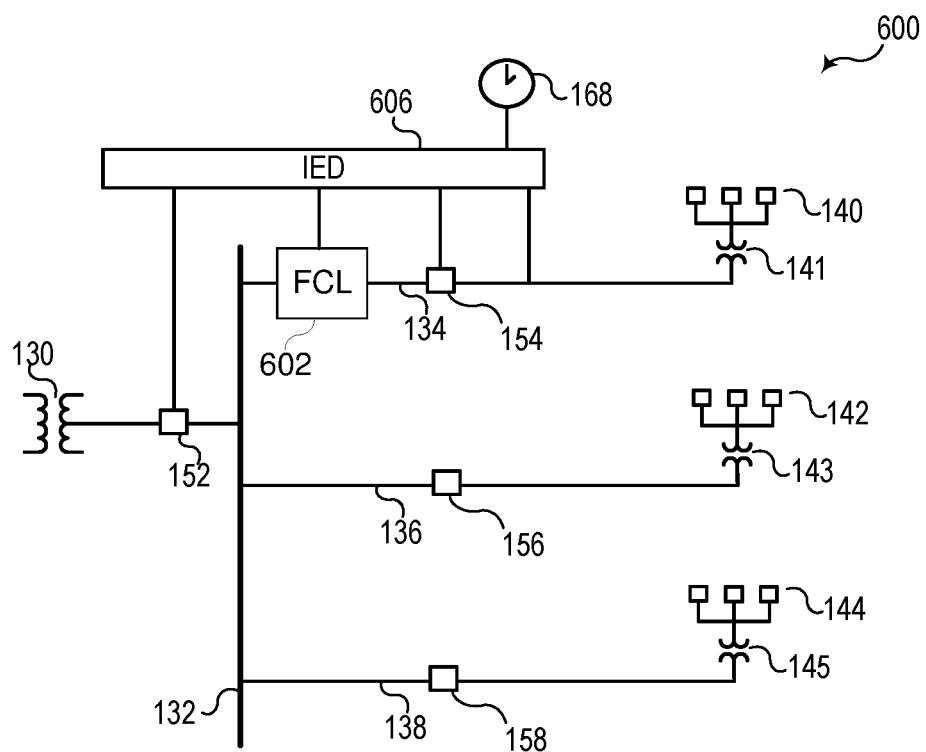
FIG. 6 illustrates a one-line diagram of a portion of an electric power delivery system.

FIG. 6 illustrates a portion of an electric power electric power delivery system 600 similar to the system of FIG. 5, except that the fault current limiter 602 is placed on feeder 134. IED 606 is in communication with the feeder 134, and may be configured to monitor electric power conditions on feeder 134. IED 606 may be configured to engage fault current limiter 602 depending on the conditions of the feeder 134. IEDs 506 and 606 of FIGS. 4 and 5 may operate according to the methods illustrated in FIGS. 7 and 8.

Certain fault current limiters may require activation by, for example, an external command signal. Once the external command signal is received, the fault current limiter may be capable of immediately limiting current to a predetermined threshold. According to several embodiments herein, a fault current limiter may be engaged to limit fault to a bus and/or feeder.

Figure 7:
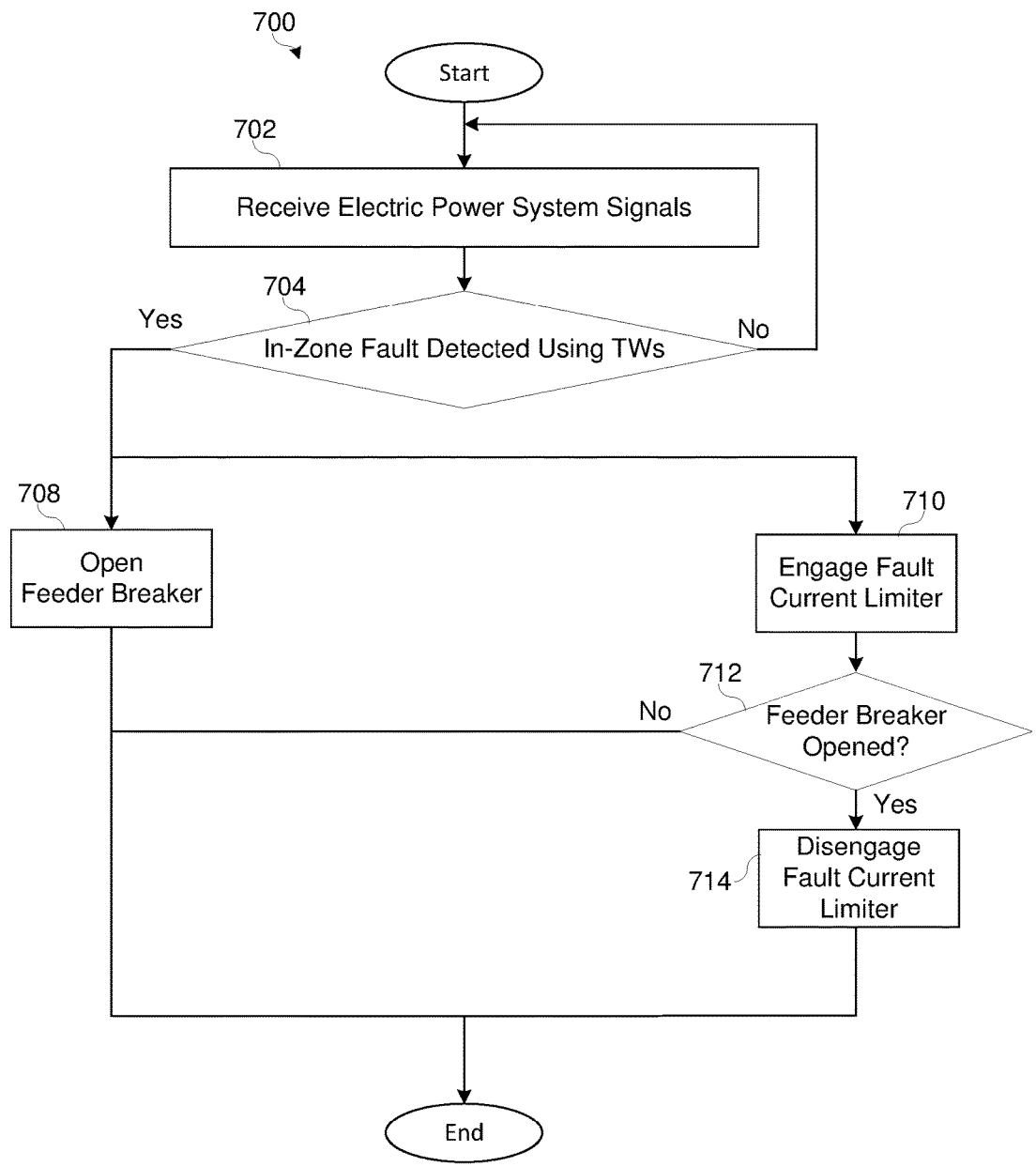
FIG. 7 illustrates a method of protecting an electric power system by detecting a traveling wave.

FIG. 7 illustrates a method 700 of protecting an electric power delivery system that may be used to protect systems such as those illustrated in FIGS. 5 and 6. The method 700 starts with an IED receiving electric power system signals 702. From the signals, the method determines whether an in-zone fault is detected 704 using, for example, traveling wave techniques, incremental quantities, or the like. If an in-zone fault is not detected, the method continues to receive electric power system signals 702 and monitor the electric power delivery system.

If, however, the method detects an in-zone fault 704, the method may continue to both signal the feeder breaker to open 708 and to engage the fault current limiter 710. The fault current limiter may be configured to engage faster than the feeder breaker can open. The method may then determine whether the feeder breaker is opened 712. If the feeder breaker has not opened, the method may end, or may continue to monitor whether the feeder breaker has opened. If the feeder breaker has opened 712, the method may disengage the fault current limiter 714, and end.

Figure 8:
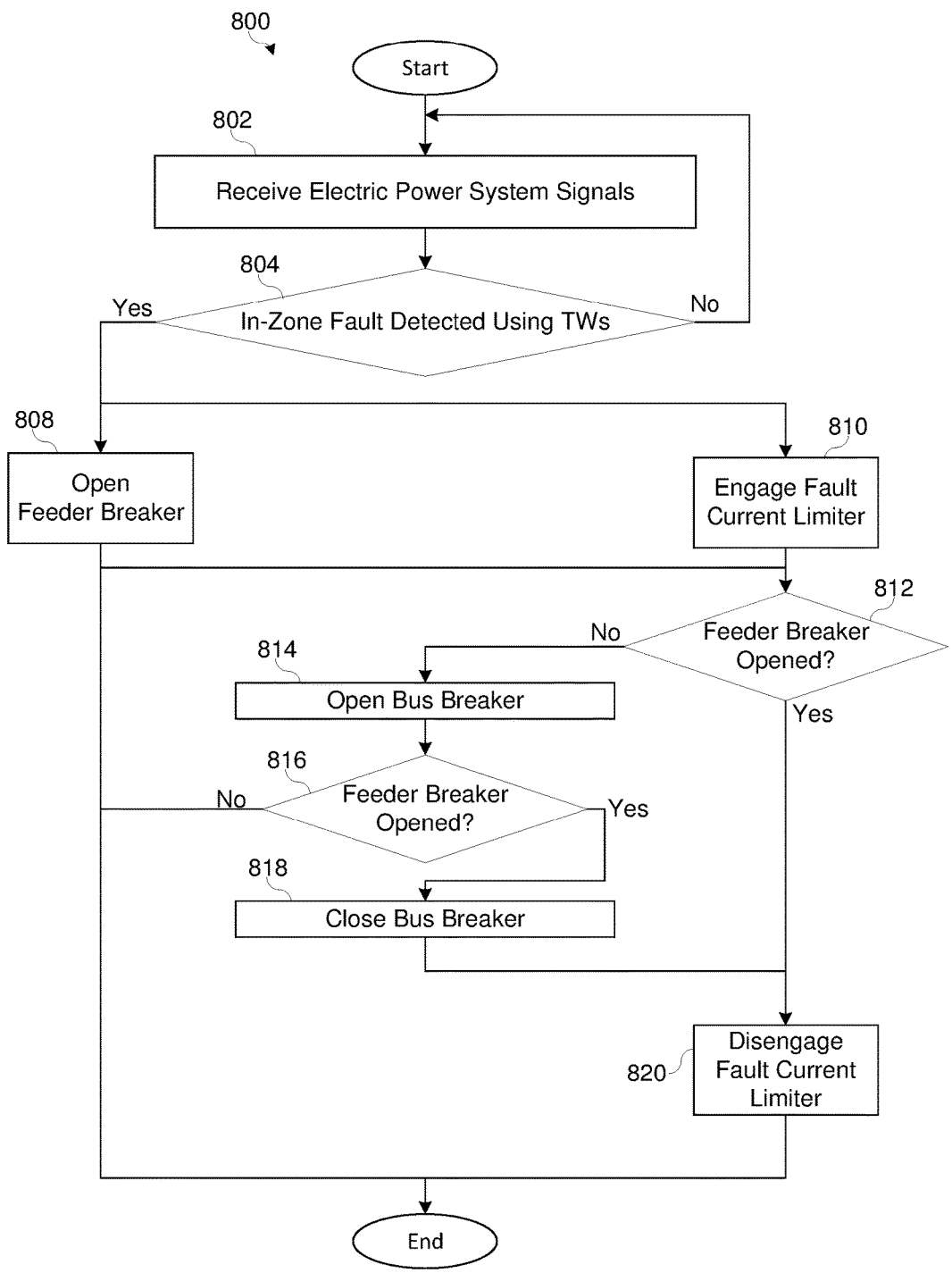
FIG. 8 illustrates a method of protecting an electric power system by detecting a traveling wave.

FIG. 8 illustrates another method 800 of protecting an electric power delivery system that may be used to protect systems such as those illustrated in FIGS. 5 and 6. The method 800 starts with an IED receiving electric power system signals 802. From the signals, the method determines whether an in-zone fault wave is detected 804 using, for example, traveling wave techniques, incremental quantities, or the like. If an in-zone fault is not detected, the method continues to receive electric power system signals 802 and monitor the electric power delivery system.

If, however, the method detects an in-zone fault 804, the method may continue to both signal the feeder breaker to open 808 and to engage the fault current limiter 810. The method may then detect whether the feeder breaker has opened 812. If the feeder breaker has opened 812, the method may disengage the fault current limiter 820 and end. Otherwise, if the feeder breaker has not opened at 812, the method may open the bus breaker 814. Once the signal is sent to the bus breaker to open, the method may determine whether the feeder breaker has yet opened 816. If the feeder breaker has not opened 816, the method may end. If the feeder breaker has opened 816, the method may then close the bus breaker 818, disengage the fault current limiter 820, and end.

Figure 9:
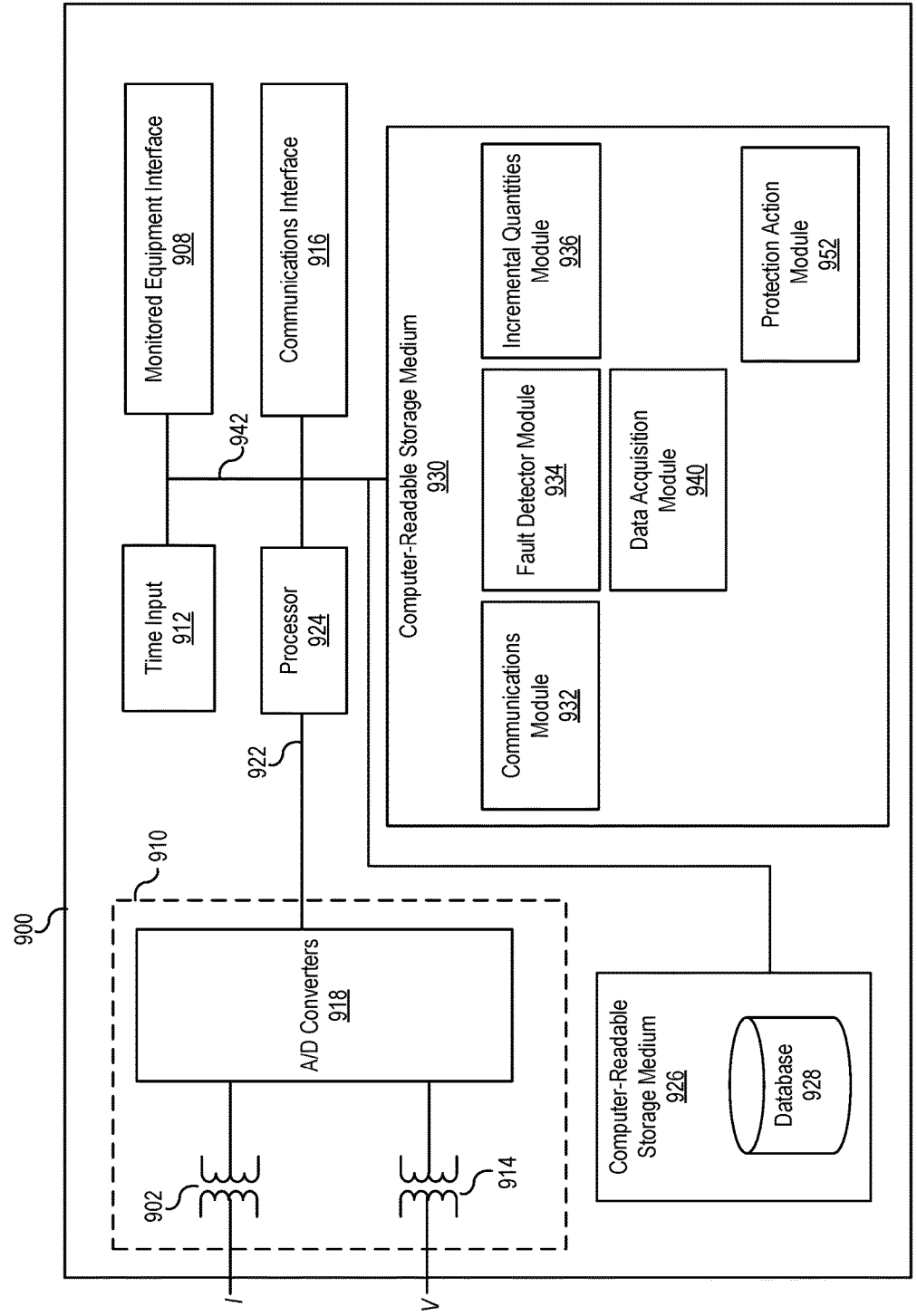
FIG. 9 illustrates a functional block diagram of a system for detecting faults and estimating a fault location using traveling waves consistent with certain embodiments of the present disclosure.

FIG. 9 illustrates a functional block diagram of a system 900 for detecting and locating faults using time-domain quantities consistent with embodiments of the present disclosure. In certain embodiments, the system 900 may comprise an IED system configured to, among other things, obtain and calculate time-domain quantities, detect and locate faults using a time-domain distance module, detect and locate faults using a time-domain directional module, and detect and locate faults using traveling waves. System 900 may be implemented using hardware, software, firmware, and/or any combination thereof. In some embodiments, system 900 may be embodied as an IED. Moreover, certain components or functions described herein may be associated with other devices or performed by other devices. The specifically illustrated configuration is merely representative of one embodiment consistent with the present disclosure.

System 900 includes a communications interface 916 configured to communicate with devices and/or IEDs. In certain embodiments, the communications interface 916 may facilitate direct communication with other IEDs or communicate with systems over a communications network. Communications interface 916 may facilitate communications through a network. System 900 may further include a time input 912, which may be used to receive a time signal (e.g., a common time reference) allowing system 900 to apply a time-stamp to the acquired samples. In certain embodiments, a common time reference may be received via communications interface 916, and accordingly, a separate time input may not be required for time-stamping and/or synchronization operations. One such embodiment may employ a standardized 988 protocol. A monitored equipment interface 908 may be configured to receive status information from, and issue control instructions to, a piece of monitored equipment (such as a circuit breaker, conductor, transformer, or the like).

Processor 924 may be configured to process communications received via communications interface 916, time input 912, and/or monitored equipment interface 908. Processor 924 may operate using any number of processing rates and architectures. Processor 924 may be configured to perform various algorithms and calculations described herein. Processor 924 may be embodied as a general purpose integrated circuit, an application specific integrated circuit, a field-programmable gate array, and/or any other suitable programmable logic device.

In certain embodiments, system 900 may include a sensor component 910. In the illustrated embodiment, sensor component 910 is configured to gather data directly from conventional electric power system equipment such as a conductor (not shown) using conventional PTs and/or CTs, or other non-conventional sensing equipment. The sensor component 910 may use, for example, transformers 902 and 914 and A/D converters 918 that may sample and/or digitize filtered waveforms to form corresponding digitized current and voltage signals provided to data bus 922. Current (I) and voltage (V) inputs may be secondary inputs from conventional instrument transformers such as, CTs and VTs. A/D converters 918 may include a single A/D converter or separate A/D converters for each incoming signal. A current signal may include separate current signals from each phase of a three-phase electric power system. A/D converters 918 may be connected to processor 924 by way of data bus 922, through which digitized representations of current and voltage signals may be transmitted to processor 924. In various embodiments, the digitized current and voltage signals may be used to calculate time-domain quantities for the detection and the location of a fault on an electric power system as described herein.

A computer-readable storage medium 926 may be the repository of a database 928 containing electric power line properties for each transmission line and/or each section of each transmission line, such as impedances, resistances, propagation times, reactances, lengths, and/or the like. Another computer-readable storage medium 930 may be the repository of various software modules configured to perform any of the methods described herein. A data bus 942 may link monitored equipment interface 908, time input 912, communications interface 916, and computer-readable storage mediums 926 and 930 to processor 924.

Computer-readable storage mediums 926 and 930 may be separate mediums, as illustrated in FIG. 9, or may be the same medium (i.e. the same disk, the same non-volatile memory device, or the like). Further, the database 928 may be stored in a computer-readable storage medium that is not part of the system 900, but that is accessible to system 900 using, for example, communications interface 916.

Communications module 932 may be configured to allow system 900 to communicate with any of a variety of external devices via communications interface 916. Communications module 932 may be configured for communication using a variety of data communication protocols (e.g., UDP over Ethernet, IEC 61850, etc.).

Data acquisition module 940 may collect data samples such as the current and voltage quantities and the incremental quantities. The data samples may be associated with a timestamp and made available for retrieval and/or transmission to a remote IED via communications interface 916. Traveling waves may be measured and recorded in real-time, since they are transient signals that dissipate rapidly in an electric power delivery system. Data acquisition module 940 may operate in conjunction with fault detector module 934. Data acquisition module 940 may control recording of data used by the fault detector module. According to one embodiment, data acquisition module 940 may selectively store and retrieve data and may make the data available for further processing. Such processing may include processing by fault detector module 934, which may be configured to determine the occurrence of a fault with an electric power distribution system using, for example, traveling waves.

An incremental quantities module 936 may be configured to calculate time domain incremental quantities based on the techniques disclosed herein. The incremental quantities module 936 may be configured to use digitized representations of current and/or voltage measurements to calculate incremental quantities therefrom. In some embodiments, system 900 may be one of a pair of IEDs in communication with different terminals on an electric power system such as the IEDs and system of FIG. 1. In one embodiment, each IED of a pair of IEDs calculates incremental quantities in its own incremental quantities module 936 for later processing and sharing between the IEDs. In another embodiment, system 900 may receive digitized representations from both the sensor component 910 and from a remote IED over a communications channel, and the incremental quantities module 936 may be configured to calculate incremental signals from both sources to calculate both local and remote incremental quantities.

A protective action module 952 may be configured to implement a protective action based on the declaration of a fault by the fault detector module 934. In various embodiments, a protective action may include tripping a breaker, selectively isolating a portion of the portion of the electric power system, operating a current limiting device, etc. In various embodiments, the protective action module 952 may coordinate protective actions with other devices in communication with system 900. In various embodiments system 900 may be configured to provide protection based on instantaneous voltages and currents. Such signal components require shorter data windows but facilitate faster protection. Various embodiments of system 900 may be configured to achieve an operating time of approximately 1 millisecond. Such a system may utilize a lumped parameter circuit-based and TW-based time-domain approach and may allow for versatile applications covering various relay input voltage sources and available communications channels. Such a system may utilize high sampling rates ($\geq 1$ MHz), high-resolution (16 bits) synchronized sampling, high-fidelity time synchronization, and a communications network capable of exchanging all acquired data ($\geq 100$ Mbps), or high numeric burden required by some of the algorithms ($\geq 1$ G multiplications per second). The protective action module 952 may operate according to the various methods herein including, for example, the methods illustrated by and described in conjunction with, FIGS. 3, 4, 7, and 8.

Although several embodiments discussed hereinabove refer to three phases of an alternating-current electric power delivery system, the principles herein may be applied to a multiple-phase alternating-current electric power system having more or less than three phases. For example, a four-phase electric power delivery system is contemplated, as is a six-phase electric power delivery system. The principles taught herein may be applied. In other embodiments, the principles taught may be applied to a direct-current electric power delivery system. In particular, traveling wave detection using currents only in a traveling wave differential module may use current quantities from a direct-current electric power delivery system to detect faults and take control actions thereon.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A device for detecting a fault in an electric power delivery system, comprising:
    an acquisition circuit in communication with a distribution branch of the electric power delivery system for obtaining current signals therefrom and producing current quantities;
    a traveling wave fault detection module in communication with the acquisition circuit configured to detect an in-zone fault using the current quantities, determine a fault condition, and provide a traveling wave fault signal upon detection of the traveling wave; and,
    a protection module in communication with the traveling wave module configured to:

determine whether a distribution circuit breaker is capable of opening before a voltage condition resulting from the fault exceeds a rated voltage of the distribution circuit breaker; and, signal the distribution circuit breaker to open before the voltage condition resulting from the fault exceeds the rated voltage condition of the distribution circuit breaker.

2. A system for protecting an electric power delivery system, comprising:

a first circuit breaker for selectively connecting a transformer with a distribution bus;

a second circuit breaker for selectively connecting the distribution bus with a distribution branch;

an intelligent electronic device ("IED") in communication with the first circuit breaker and the second circuit breaker, and including:

an acquisition circuit in communication with the distribution branch for obtaining current signals therefrom and producing current quantities;

a traveling wave fault detection module in communication with the acquisition circuit configured to detect an in-zone fault using the current quantities, determine a fault condition, and provide a traveling wave fault signal upon detection of the traveling wave; and, a protection module in communication with the traveling wave module configured to:

determine whether the second circuit breaker is capable of opening before a voltage condition resulting from the fault will exceed a rated voltage of the second circuit breaker; and, signal the second circuit breaker to open before the voltage condition resulting from the fault exceeds the rated voltage condition of the distribution circuit breaker.

3. The system of claim 2, wherein the protection module is further configured to signal the first circuit breaker to open when it determines that the second circuit breaker is not capable of opening before the voltage condition resulting from the fault will exceed the rated voltage.

4. The system of claim 3, wherein the protection module is further configured to signal the second circuit breaker to open after the first circuit breaker has opened.

5. The system of claim 4, wherein the protection module is further configured to signal the first circuit breaker to close after the second circuit breaker is open.

6. The system of claim 2, wherein the second circuit breaker is a solid-state circuit breaker.

7. The system of claim 2, wherein the second circuit breaker is a microelectromechanical system ("MEMS") device.

8. A method of protecting an electric power delivery system, comprising:

an intelligent electronic device ("IED") in communication with the electric power delivery system obtaining current signals from the electric power delivery system;

detecting an in-zone fault using the current signals from a portion of the electric power delivery system;

determining whether a circuit breaker is capable of opening before an overvoltage condition resulting from the in-zone fault will exceed a rated voltage of the circuit breaker; and signaling the circuit breaker to open the portion of the electric power delivery system before the overvoltage condition from the fault arrives at the circuit breaker.

9. A method of protecting an electric power delivery system, comprising:

an intelligent electronic device ("IED") in communication with the electric power delivery system obtaining current signals from the electric power delivery system;

detecting an in-zone fault using the current signals from a portion of the electric power delivery system;

determining whether a circuit breaker is capable of opening before an overcurrent condition resulting from the in-zone fault will exceed a rated current of the circuit breaker; and signaling the circuit breaker to open the portion of the electric power delivery system before the overcurrent condition from the fault arrives at the circuit breaker.

10. A method of protecting an electric power delivery system, comprising:

an intelligent electronic device ("IED") in communication with the electric power delivery system obtaining current signals from the electric power delivery system;

detecting an in-zone fault using the current signals from a portion of the electric power delivery system;

determining whether a circuit breaker is capable of opening before a state of the electric power system at the circuit breaker due to the in-zone fault exceeds a rated condition of the circuit breaker; and signaling a circuit breaker to open the portion of the electric power delivery system before the state of the electric power system at the circuit breaker exceeds the rated opening condition of the circuit breaker.

11. The method of claim 10, wherein the state comprises current.

12. A method of protecting an electric power delivery system, comprising:

an intelligent electronic device ("IED") in communication with the electric power delivery system obtaining current signals from the electric power delivery system;

detecting an in-zone fault a first portion of the electric power delivery system;

determining whether a first circuit breaker selectively connecting the first portion of the electric power delivery system is capable of opening before a state of the electric power delivery system at the first circuit breaker exceeds rated opening conditions of the circuit breaker;

when the first circuit breaker is capable of opening before the state of the electric power delivery system at the first circuit breaker exceeds the rated opening conditions, signal the first circuit breaker to open.

13. The method of claim 12, further comprising:

when the first circuit breaker is not capable of opening before the state of the electric power delivery system at the first circuit breaker exceeds the rated opening conditions, signal a second circuit breaker to open.

14. The method of claim 13, further comprising:

opening the first circuit breaker after the second circuit breaker has opened; and, closing the second circuit breaker after the first circuit breaker has opened.

15. The method of claim 14, wherein the second circuit breaker connects both the first portion of the electric power delivery system and a second portion of the electric power delivery system.

16. The method of claim 15, wherein first portion of the electric power delivery system is a distribution feeder, and the second portion of the electric power delivery system is another distribution feeder.

17. The method of claim 15, wherein the second portion of the electric power delivery system includes the first portion of the electric power delivery system.

18. The method of claim 12, wherein the first circuit breaker is a solid-state circuit breaker.

19. A device for detecting a fault in an electric power delivery system, comprising:
   an acquisition circuit in communication with a distribution branch of the electric power delivery system for obtaining current signals therefrom and producing current quantities;
   a traveling wave fault detection module in communication with the acquisition circuit configured to detect an in-zone fault using the current quantities, determine a fault condition, and provide a traveling wave fault signal upon detection of the in-zone fault; and,
   a protection module in communication with the traveling wave fault detection module configured to:
      signal a fault current limiter to engage and a distribution circuit breaker to open upon receipt of the traveling wave fault signal;
      determine wither the circuit breaker opened; and
      when it is determined that the circuit breaker has opened, disengage the fault current limiter.

20. A system for protecting an electric power delivery system, comprising:
   a first circuit breaker for selectively connecting a transformer with a distribution bus;
   a second circuit breaker for selectively connecting the distribution bus with a distribution branch;
   a fault current limiter for selectively limiting current through a portion of the electric power delivery system;
   an intelligent electronic device ("IED") in communication with the first circuit breaker and the second circuit breaker, and including:
      an acquisition circuit in communication with the distribution branch for obtaining current signals therefrom and producing current quantities;
      a traveling wave fault detection module in communication with the acquisition circuit configured to detect an in-zone fault condition using the current quantities, and provide a traveling wave fault signal upon detection of the in-zone fault; and,
      a protection module in communication with the traveling wave module configured to:
         signal the second circuit breaker to open upon detection of the in-zone fault,
         determine whether the second circuit breaker has opened; and,
         when the second circuit breaker has not opened, signal the first circuit breaker to open.

21. The system of claim 20, wherein the protection module is further configured to signal the fault current limiter to engage upon detection of the traveling wave.

22. The system of claim 21, wherein the protection module is further configured to:
   determine whether the second circuit breaker has opened and;
   when the second circuit breaker has opened, signal the fault current limiter to disengage.

* * * * *